(12) United States Patent
Tetrault

(10) Patent No.: US 10,048,368 B1
(45) Date of Patent: Aug. 14, 2018

(54) SINGLE ANTENNA ALTIMETER SYSTEM AND RELATED METHOD

(71) Applicant: Rockwell Collins, Inc., Cedar Rapids, IA (US)

(72) Inventor: Howard D. Tetrault, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 190 days.

(21) Appl. No.: 15/140,787

(22) Filed: Apr. 28, 2016

Related U.S. Application Data

(63) Continuation of application No. 13/891,985, filed on May 10, 2013, now Pat. No. 9,354,306.

(51) Int. Cl.
*G01S 13/88* (2006.01)
*G01S 13/34* (2006.01)
*G01S 13/00* (2006.01)

(52) U.S. Cl.
CPC ............ *G01S 13/882* (2013.01); *G01S 13/34* (2013.01)

(58) Field of Classification Search
CPC ......... G01S 13/882; G01S 13/34; G01S 7/021
See application file for complete search history.

(56) References Cited

U.S. PATENT DOCUMENTS

| 3,065,465 A | 11/1962 | Wimberly |
| 3,248,729 A | 4/1966 | Howard et al. |
| 3,611,377 A | 10/1971 | Rittenbach |
| 3,816,829 A | 6/1974 | O'Farrell |
| 3,829,860 A | 8/1974 | Cutler et al. |
| 4,008,475 A | 2/1977 | Johnson |
| 4,106,020 A | 8/1978 | Johnson |
| 4,245,221 A | 1/1981 | Kipp et al. |
| 4,306,236 A | 12/1981 | Johnson |

(Continued)

FOREIGN PATENT DOCUMENTS

EP 1239298 A2 * 9/2002 ............ G01S 13/34

OTHER PUBLICATIONS

M. I. Skolnik, "Introduction to Radar Systems"; second edition; McGraw-Hill Book Company; New York, NY, USA; printed in the year 1980; ISBN 0-07-057909-1; p. 365 text and Figure 9.9. (Year: 1980).*

*Primary Examiner* — Bernarr E Gregory
(74) *Attorney, Agent, or Firm* — Angel N. Gerdzhikov; Donna P. Suchy; Daniel M. Barbieri

(57) ABSTRACT

A system and related method is disclosed for determining a range between a single antenna array and a surface. The system includes a source generator configured to generate a source signal, a coupler, a circulator, a mixer, and a digital signal processor. The source generator generates a frequency modulated continuous wave source signal. The coupler splits the source signal into a transmission signal and a coupled signal. The circulator receives the transmission signal from the coupler, outputs the transmission signal to an antenna, and receives a reception signal from the antenna, which may be a reflection of the transmission signal from the surface. The mixer mixes the reception signal from the circulator and the coupled signal from the coupler to generate a low frequency return signal. The digital signal processor determines a range between the antenna and the surface based on the low frequency return signal.

20 Claims, 6 Drawing Sheets

(56) References Cited

U.S. PATENT DOCUMENTS

| | | | |
|---|---|---|---|
| 4,714,928 A * | 12/1987 | Schmitt | G01S 13/34 |
| 4,983,979 A | 1/1991 | McKenzie | |
| 5,189,427 A | 2/1993 | Stove et al. | |
| 6,977,611 B1 * | 12/2005 | Crabb | G01S 7/021 |
| 7,239,266 B2 | 7/2007 | Vacanti | |
| 7,982,661 B2 | 7/2011 | Beasley | |
| 8,259,002 B2 | 9/2012 | Vacanti et al. | |
| 8,537,049 B2 | 9/2013 | Hase | |
| 8,866,667 B2 | 10/2014 | Vacanti | |

\* cited by examiner

SINGLE ANTENNA ALTIMETER SYSTEM AND RELATED METHOD

CROSS-REFERENCE TO RELATED APPLICATION

The present application is a Continuation of and claims the benefit under 35 U.S.C. § 120 of U.S. patent application Ser. No. 13/891,985, filed May 10, 2013, now U.S. Pat. No. 9,354,306, entitled SINGLE ANTENNA ALTIMETER SYSTEM AND RELATED METHOD, which is incorporated herein by reference in its entirety.

FIELD OF THE INVENTION

The present invention relates generally to radio altimetry systems and components thereof. More particularly, embodiments of the present invention relate to a system and method for single antenna transmission and reception of a radio altimetry signal.

BACKGROUND OF THE INVENTION

Traditional radio altimeter systems have been plagued with many limitations. Most significantly, traditional Low Range Altimeter (LRA) installation systems form a closed loop. This close loop is normally formed from transmitting a modulated signal in the 4.3 GHz band on a transmitting antenna and receiving the ground reflected signal via a second receiving antenna. Then, the system mixes the ground reflected signal with the transmitted modulated signal within the receiver to determine the round-trip delay of the signal.

These closed loop systems induce challenges to manufacturers and operators desirous of accurate radio altitude information in a variety of ways. Since each of the signals is vital to proper operation, a high level of isolation is required between the transmit (Tx) antenna and the receive (Rx) antenna. Traditional systems are prone to false altitude detection from leakage (reflections from surrounding vehicle structure between Tx and Rx antenna). Cable routing and shielding is also critical to avoid leakage. This labor intensive routing and shielding requires continuous isolation between coaxial feed lines greater than 120 dB.

Traditional systems further require a calibrated delay for zero feet altitude (defined as the Aircraft Installation Delay (AID)). Specific lengths of coaxial cable must be used to ensure the correct AID. This requires the Line Replaceable Unit (LRU) to be located close to the antenna (approximately 12 to 15 feet).

Consequently, a need remains for an alternative to large form factor radio altimeter systems requiring multiple antennas and labor intensive cable routing and shielding.

SUMMARY OF THE INVENTION

In one aspect, embodiments of the inventive concepts disclosed herein are directed to a system. The system may include a source generator to generate a source signal, where the source signal is a frequency modulated continuous wave signal. The system may further include a coupler to receive the source signal and split the source signal into a transmission signal and a coupled signal. The system may further include a circulator. The circulator may receive the transmission signal from the coupler, output the transmission signal to an antenna, receive a reception signal from the antenna, and output the reception signal. The reception signal may be a reflection of the transmission signal from a radio frequency selective surface. The system may further include a mixer to mix the reception signal received from the circulator and the coupled signal received from the coupler to generate a low frequency return signal. The system may further include a digital signal processor to determine a range between the antenna and the radio frequency selective surface based on the low frequency return signal received from the mixer.

In a further aspect, embodiments of the inventive concepts disclosed herein are directed to a system. The system may include a single antenna array for sending a transmission signal and receiving a reception signal. The system may further include a source generator to generate a source signal, where the source signal is a frequency modulated continuous wave signal. The system may further include a pair of bias tees to route one or more signals. The system may further include a coupler to receive the source signal from the source generator via the pair of bias tees and split the source signal into the transmission signal and a coupled signal. The system may further include a circulator. The circulator may receive the transmission signal from the coupler, output the transmission signal to the single antenna array, receive a reception signal from the single antenna array, and output the reception signal. The reception signal may be a reflection of the transmission signal from a radio frequency selective surface. The system may further include a mixer to mix the reception signal received from the circulator and the coupled signal received from the coupler to generate a low frequency return signal. The system may further include a digital signal processor to receive the low range frequency return signal from the mixer via the pair of bias tees. The digital signal processor may further determine a range between the antenna and the radio frequency selective surface based on the low frequency return signal.

In a further aspect, embodiments of the inventive concepts disclosed herein are directed to a method. The method may include: generating a source signal via a source generator, wherein the source signal is a frequency modulated continuous wave signal; selectively routing the source signal via a circulator; splitting the source signal into a transmission signal and a coupled signal via a coupler; transmitting the transmission signal via a radio-frequency signal from an antenna; receiving a radio-frequency reception signal via the antenna, the reception signal being a reflection of the transmission signal, the reflection caused by the radio-frequency reflective surface; selectively routing the reception signal via the circulator, the reception signal isolated from the transmission signal within the circulator by at least 30 dB; mixing the coupled signal with the reception signal to create a low frequency return signal; and determining a range between the antenna and the radio frequency reflective surface based on the low frequency return signal.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention are directed to a small form factor single antenna radio altimeter system configured for accurate radio altimetry measurements between the single antenna and a radar reflective surface. The single antenna transmits and receives RF energy while maintaining a small form factor capable of installation on board a variety of platforms.

Figure 1:
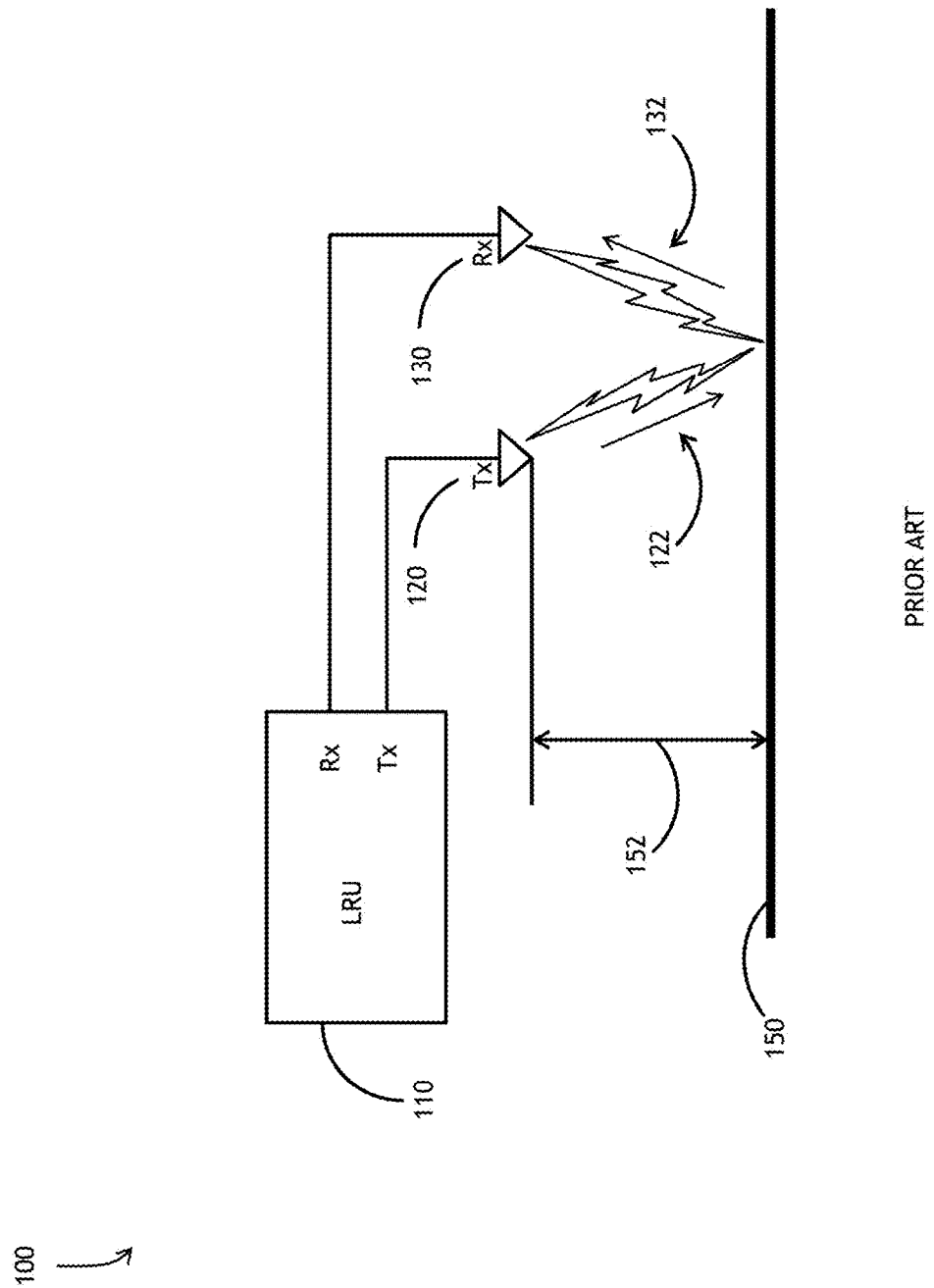
FIG. 1 is a prior art diagram of a traditional radio altimeter system.

Referring to FIG. 1, a prior art diagram of a traditional radio altimeter system is shown. Prior art systems may include a LRU 110 configured to transmit a signal and receive a signal. Transmitting antenna 120 transmits transmission signal 122. RF reflective surface 150 reflects the reception signal 132 received by receiving antenna 130. Traditional LRU may then act to determine a range 152 between the antennas 120, 130 and the reflective surface 150.

Figure 2:
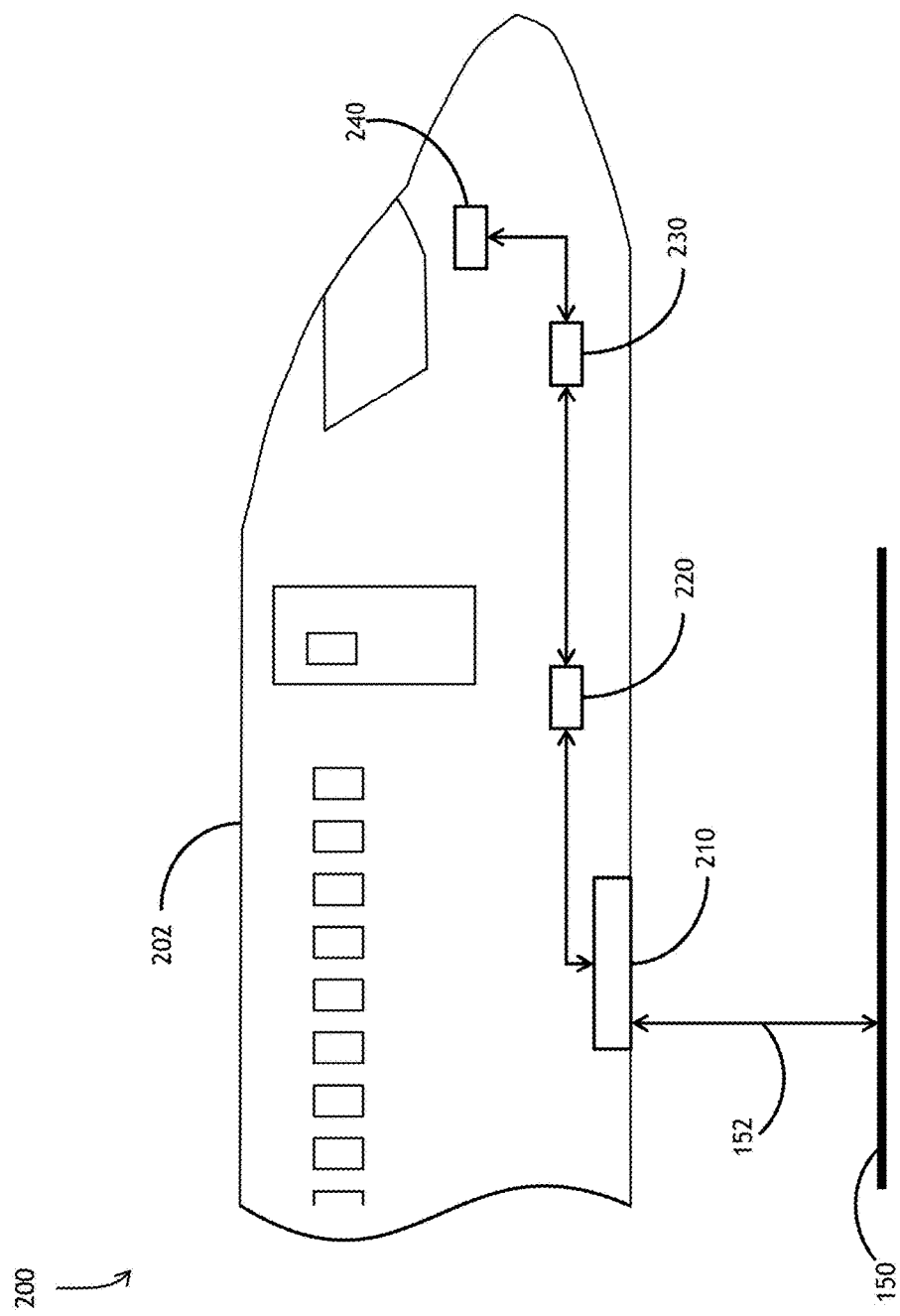
FIG. 2 is a single antenna radio altimeter system as exemplarily mounted on an airplane in accordance with an embodiment of the present invention.

Referring to FIG. 2, a single antenna radio altimeter system as exemplarily mounted on an airplane in accordance with an embodiment of the present invention is shown. Antenna unit 210 may be operationally mounted for unobstructed RF transmission and reception on an external surface of the vehicle 202. Antenna unit 210 functions to transmit and receive RF energy as one of the sub-systems of system 200.

An additional goal of the present invention includes a single small form factor antenna to site on the undercarriage of the aircraft where antenna characteristics may be monitored by monitoring the leakage components. Altimeter unit 220 may be mounted in an operationally convenient location on board vehicle 202. Altimeter unit 220 may also function to house additional sub-systems of the overall system 200.

Display processor 230 may optionally receive signals from the altimeter unit 220 and configure the signals for human perception via a display 240. In embodiments, display processor 230 may be eliminated from system 200 in favor of a direct link to a communications device or additional systems. It is contemplated herein; single antenna radio altimeter system 200 may receive range information from antenna unit 210 and altimeter unit 220, and transmit the range information to an additional system for further use. For example, a plurality of antennas incorporated within single antenna radio altimeter system 200 may transmit range information from a plurality of bearings to an on board processor to determine a three dimensional distance from a surface 150 or an object.

One goal of the present invention may include a small form factor single antenna unit configurable for the vehicle upon which the antenna is operationally mounted. For example, as mounted on an aircraft, the antenna unit 210 may conform to the contours of the underside of the aircraft creating an operational radio altimeter while maintaining near zero added skin friction drag to the surface of the aircraft. Additionally, as mounted on an automobile, the highly configurable single antenna radio altimeter system 200 may successfully mount in locations of small form factor only accessible by a single antenna or a single communications cable.

Figure 3:
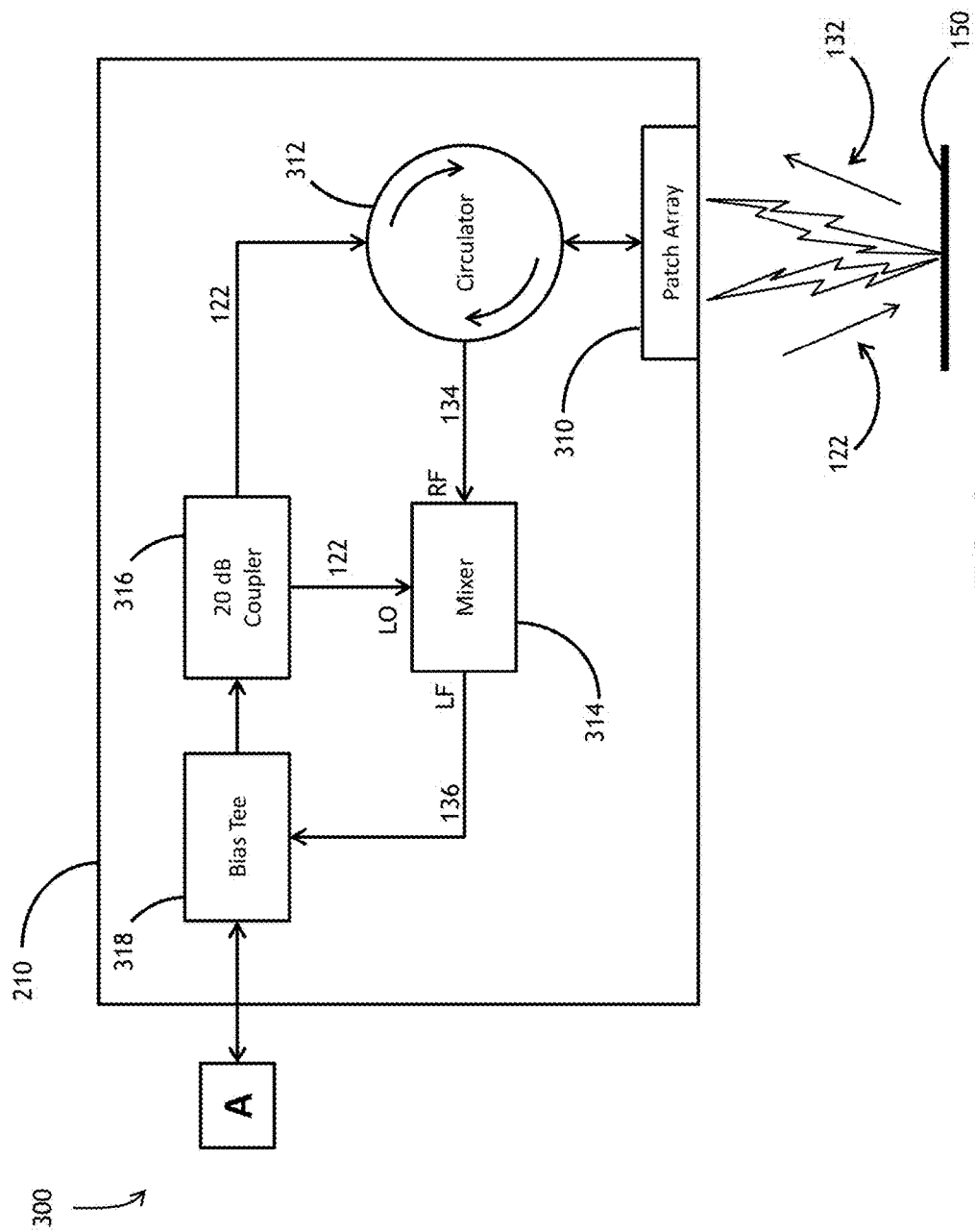
FIG. 3 is a diagram of a single antenna radio altimeter antenna unit exemplary of an embodiment of the present invention.

Referring to FIG. 3, a diagram of a single antenna radio altimeter antenna unit exemplary of an embodiment of the present invention is shown. System 300 may exemplarily include antenna unit 210, within or adjacent to the antenna unit 210 housing is an antenna patch array 310. System 300 further includes an electronic package containing a coupler 316, mixer 314 and circulator 312 to generate the receiver return.

Antenna patch array 310 functions as the transmitter and receiver for RF wireless signals employed by single antenna radio altimeter system 300. Transmission signal 122 is received through bias tee 318 and transmitted to coupler 316. System 300 couples transmission signal 122 to mixer 314 through the LO input and to circulator 312. Coupler 316 may function to tap off a portion of the transmitted FMCW waveform (transmission signal 122) for mixing with the received FMCW waveform (reception signal 132) that is reflected from the surface 150. Circulator 312 is used to separate the transmitted signal (traveling from the coupler 316 to the Patch Array 310) from the return signal (traveling from the Patch Array 310 to the Mixer 314).

In furtherance of the additional goal of the present invention of a constant and deterministic isolation between the reception signal and the transmission signal, circulator 312 functions to selectively route both the transmission signal 122 and the reception signal 132. System 300 additionally employs circulator 312 to provide at least 30 dB of isolation between the transmission signal 122 and the reception signal 132.

When routing the transmission signal 122, circulator 312 receives the transmission signal 122 from the coupler 316 and transmits it to the antenna patch array 310. Antenna patch array 310 functions to both transmit the transmission signal 122 and, as the transmit signal is reflected from RF reflective surface 150, to receive the reception signal 132. Antenna patch array 310 receives the reception signal 132 and transmits it through circulator 312 to the RF input of mixer 314. In one embodiment, a circulator 312 with 40 dB of isolation between a Tx port and a Rx port functions to ensure the mixer 314 is not overloaded.

System 300 may employ a specific transmitter power of +24 dBm coupled to the mixer LO input through a 20 dB coupler. As reception signal 132 is received by antenna patch array 310 and passes through the circulator 312, it is delayed by an exemplary 5 ns delay. The delayed return signal 134 is connected to the RF input of mixer 314.

The exemplary 5 ns delayed transmitter leakage signal will produce a low frequency return signal 136 that is used to adjust for losses in the transmission line between the transceiver within the LRU 220 and the antenna unit 210.

System 300 may cancel the low frequency return signal 136 in software along with all other static leakage signals that result from fixed structures physically near the antenna patch array 310. For example, system 300 compensates for additional antennas, landing gear and flaps on the undercarriage of an aircraft to ensure precise radio altimetry.

A further goal of the present invention includes a low cost, size and weight system where cable length between the LRU and antenna is not critical. It is further contemplated herein; system 300 may function within the scope of the present invention with the antenna patch array 310 sited remotely from the antenna unit 210.

Figure 4:
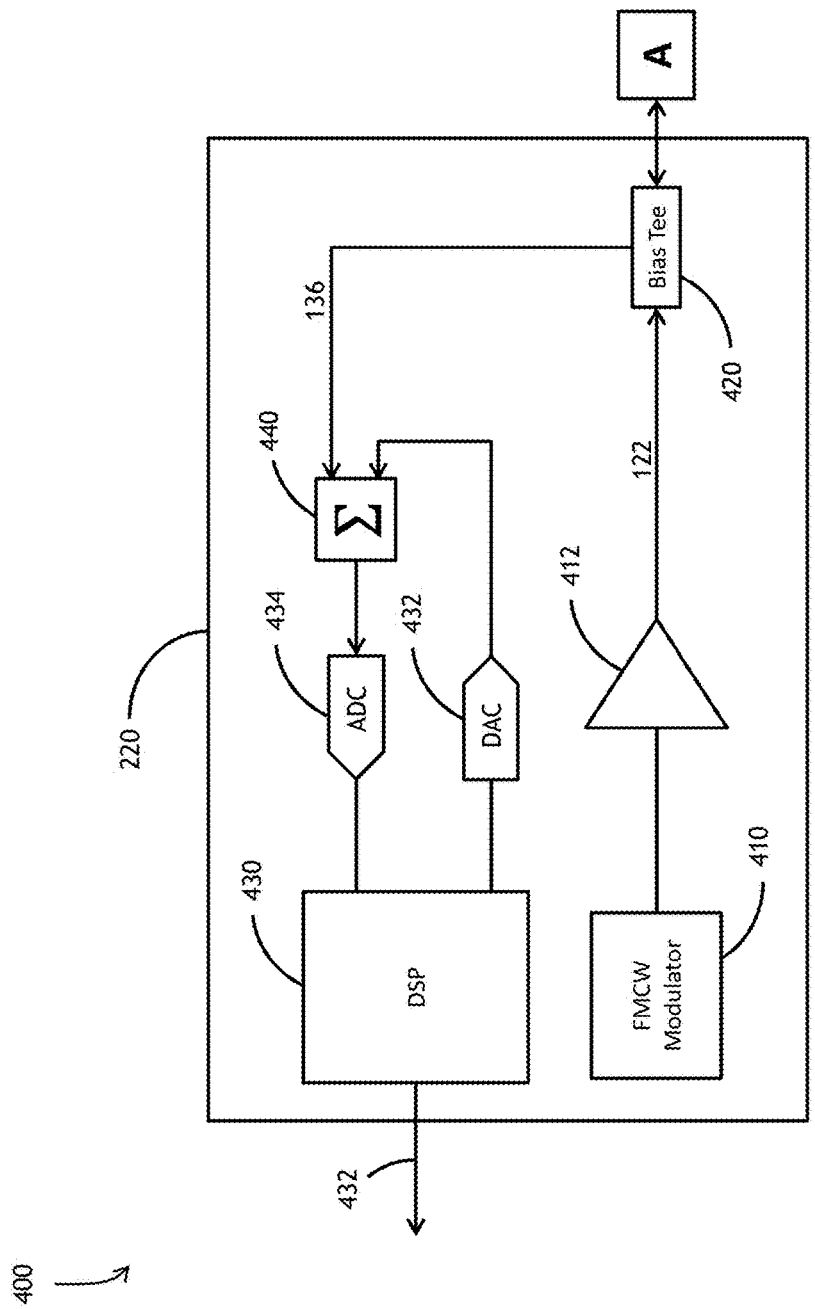
FIG. 4 is a diagram of an altimeter unit of single antenna radio altimeter exemplary of an embodiment of the present invention.

Referring to FIG. 4, a diagram of an altimeter unit of single antenna radio altimeter exemplary of an embodiment of the present invention is shown. System 400 may comprise altimeter unit 220 including associated components for precise radio altimetry. System 400 may be optimally configured for housing with a LRU. Altimeter unit 220 may comprise Frequency Modulated Continuous Wave (FMCW) modulator 410, transmitter 412 and the sampler circuit to digitize the low frequency return signal 136 from the antenna unit 210.

Sampler circuit may include Digital Signal Processor (DSP) 430 configured for processing low frequency return signal 136, once converted. Digital to Analog Converter (DAC) 432 and Analog to Digital Converter (ADC) 434. Summing unit 440 receives analog signals from low frequency return signal 136 from the antenna unit 210 and from an external DAC to aid in canceling out any strong static leakage term from the antenna unit 210. Output 432 from DSP may be specially configured for a variety of potential outputs. It is contemplated herein; outputs may be exemplary configured for a display perceptible by a human, an additional warning sub-system and a transmitter for offboard transmission.

System 400 generates the FMCW RF waveform and outputs it to the antenna unit 210 through the transmission signal 122. System 400 couples the low frequency return signal 136 through the same connector (e.g., coax) and operatively connects each signal and unit through the use of low-frequency bias tees 318, 420.

System 400 further analyzes the return low frequency return signal 136 and adjusts the power to the antenna unit 210 based on the strength of the leakage return from the circulator 312.

Figure 5:
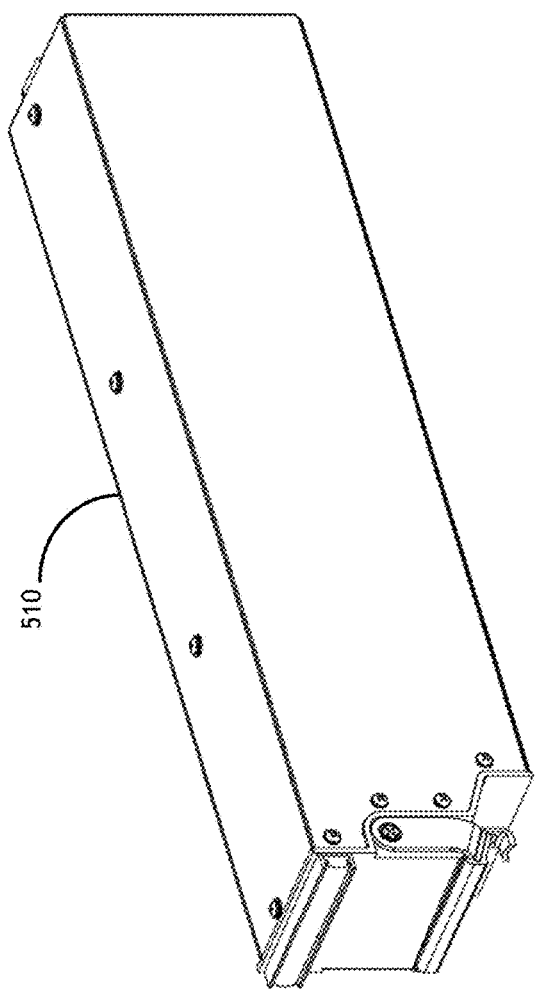
FIG. 5 is a diagram of an avionics housing within which embodiments of the present invention may be configured to conform.

Referring to FIG. 5, a diagram of an avionics housing within which embodiments of the present invention may be configured to conform is shown. One goal of the present invention is a reduction in size, weight, power and cost compared to traditional systems. System 400 may be configured to reside within an existing LRU 510.

Figure 6:
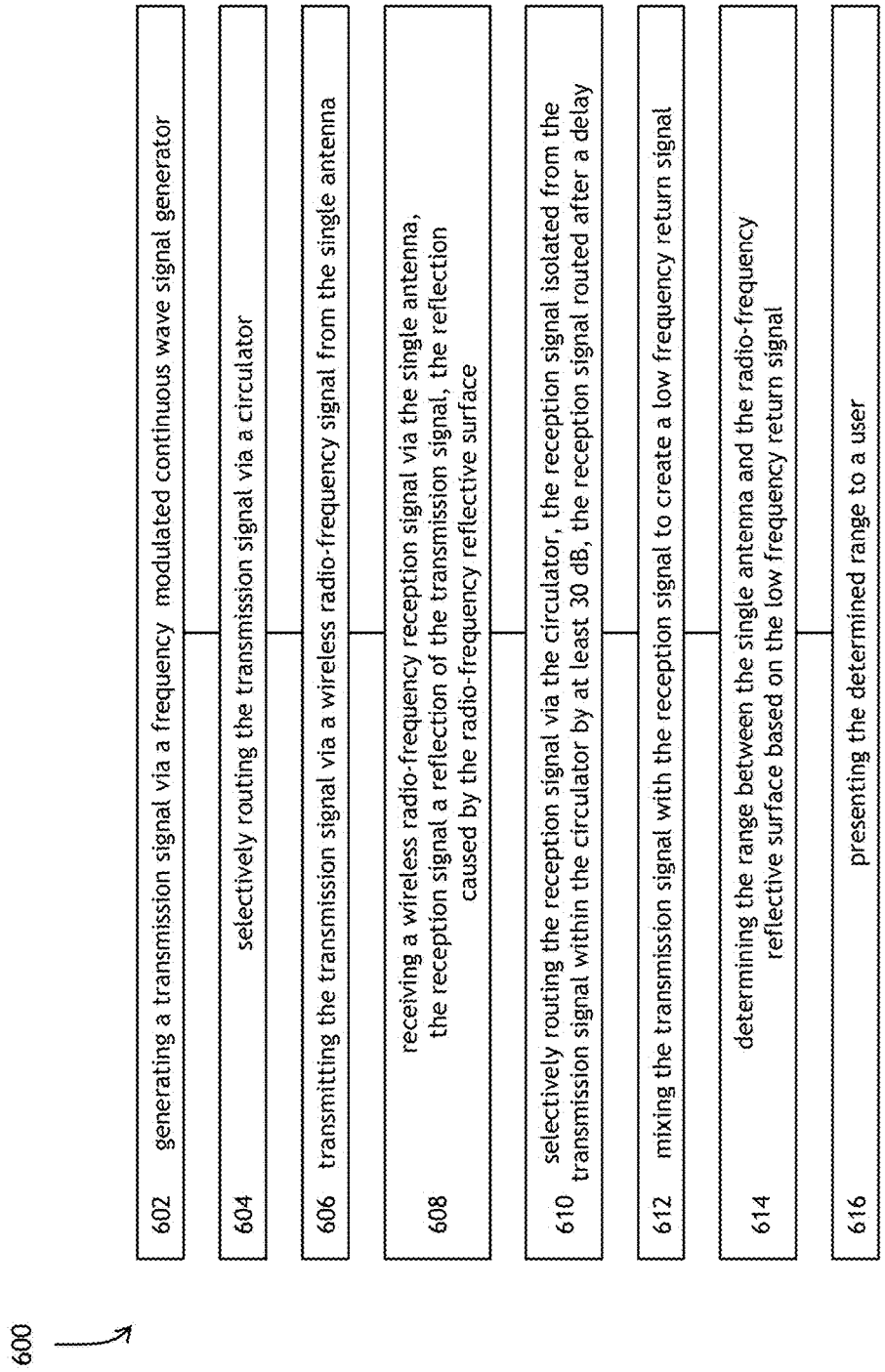
FIG. 6 is a flow diagram of a method for single antenna radio altimetry exemplary of an embodiment of the present invention.

Referring to FIG. 6, a flow diagram of a method for single antenna radio altimetry exemplary of an embodiment of the present invention is shown. Method 600 begins at step 602 with generating a transmission signal via a frequency modulated continuous wave signal generator, at step 604, selectively routing the transmission signal via a circulator, and, at step 606, transmitting the transmission signal via a wireless radio-frequency signal from the single antenna. The method continues at step 608 with receiving a wireless radio-frequency reception signal via the single antenna, the reception signal a reflection of the transmission signal, the reflection caused by the radio-frequency reflective surface, and, at step 610, selectively routing the reception signal via the circulator, the reception signal isolated from the transmission signal within the circulator by at least 30 dB, the reception signal routed after a delay, and, at step 612, mixing the transmission signal with the reception signal to create a low frequency signal, and, at step 614, determining the range between the single antenna and the radio-frequency reflective surface based on the low frequency signal, and at step 616, presenting the determined range to a user.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A system, comprising:
    a source generator configured to generate a source signal, wherein the source signal is a frequency modulated continuous wave signal;
    a coupler configured to receive the source signal, the coupler further configured to split the source signal into a transmission signal and a coupled signal;
    a circulator configured to:
        receive the transmission signal from the coupler,
        output the transmission signal to an antenna,
        receive a reception signal from the antenna, the reception signal being a reflection of the transmission signal from a surface;
        output the reception signal;
    a mixer configured to mix the reception signal received from the circulator and the coupled signal received from the coupler to generate a low frequency return signal; and
    a digital signal processor configured to determine a range between the antenna and the surface based on the low frequency return signal received from the mixer, wherein the digital signal processor is further configured to adjust a power of the source signal based on a strength of a leakage signal from the circulator.

2. The system of claim 1, wherein the reception signal received by the circulator from the antenna is delayed by a fixed time delay.

3. The system of claim 2, wherein the time delay is approximately 5 nanoseconds.

4. The system of claim 2, wherein the reception signal output from the circulator includes the leakage signal, wherein the low frequency return signal is modified by the leakage signal, wherein the digital signal processor is further configured to adjust a power of the source signal based on a strength of the leakage signal.

5. The system of claim 1, further comprising:
an analog summing unit configured to generate an analog summed signal based on the low frequency return signal and a processor-generated signal configured to cancel the leakage signal associated with the low frequency return signal; and
an analog to digital converter, the analog to digital converter configured to receive the analog summed signal and generate a digital summed signal, wherein the digital summed signal is received by the digital signal processor.

6. The system of claim 1, wherein the circulator is further configured to isolate the transmission signal and the reception signal by at least 30 dB.

7. The system of claim 1, further comprising:
a display processor configured to convert the range to information perceptible by a human and rendering the information on a notification device, the information comprising at least one of a visual display of the range or an audio alert.

8. A system, comprising:
an altimeter unit comprising:
a source generator configured to generate a source signal, wherein the source signal is a frequency modulated continuous wave signal; and
a digital signal processor;
a single antenna configured for sending a transmission signal and receiving a reception signal; and
an antenna unit coupled to the single antenna, the antenna unit coupled to the altimeter unit via a pair of bias tees configured to route one or more signals using a single cable, the antenna unit comprising:
a coupler configured to receive the source signal from the source generator via the pair of bias tees, the coupler further configured to split the source signal into the transmission signal and a coupled signal;
a circulator configured to:
receive the transmission signal from the coupler;
output the transmission signal to the single antenna;
receive the reception signal from the single antenna, the reception signal being a reflection of the transmission signal from a surface; and
output the reception signal; and
a mixer configured to mix the reception signal received from the circulator and the coupled signal received from the coupler to generate a low frequency return signal, the digital signal processor configured to receive the low range frequency return signal from the mixer via the pair of bias tees, the digital signal processor further configured to determine a range between the single antenna and the surface based on the low frequency return signal.

9. The system of claim 8, further comprising:
a delay device configured to delay the reception signal received by the antenna by a time delay.

10. The system of claim 9, wherein the time delay is approximately 5 nanoseconds.

11. The system of claim 9, wherein the reception signal output from the circulator includes a leakage signal, wherein the low frequency return signal is modified by the leakage signal, wherein the digital signal processor is further configured to adjust a power of the source signal based on a strength of the leakage signal.

12. The system of claim 8, further comprising:
an analog summing unit configured to generate an analog summed signal based on the low frequency return signal and a processor-generated signal configured to cancel at least one leakage signal associated with the low frequency return signal; and
an analog to digital converter, the analog to digital converter configured to receive the analog summed signal and generate a digital summed signal, wherein the digital summed signal is received by the digital signal processor.

13. The system of claim 8, wherein the circulator is further configured to isolate the transmission signal and the reception signal by at least 30 dB.

14. The system of claim 8, further comprising:
a display processor configured to convert the range to information perceptible by a human and rendering the information on a notification device, the information comprising at least one of a visual display of the range or an audio alert.

15. The system of claim 8, wherein the altimeter unit is configured to be housed in a line replaceable unit of an aircraft.

16. A method, comprising:
generating a source signal via a source generator, wherein the source signal is a frequency modulated continuous wave signal;
selectively routing the source signal via a circulator;
splitting the source signal into a transmission signal and a coupled signal via a coupler;
transmitting the transmission signal via a radio-frequency signal from an antenna;
receiving a radio-frequency reception signal by the antenna, the reception signal being a reflection of the transmission signal, the reflection caused by a radio-frequency reflective surface;
selectively routing the reception signal via the circulator, the reception signal isolated from the transmission signal within the circulator by at least 30 dB;
mixing the coupled signal with the reception signal to create a low frequency return signal;
adjusting a power of the transmission signal based on a strength of a leakage signal from the circulator; and
determining a range between the antenna and the radio frequency reflective surface based on the low frequency return signal; and
presenting the determined range to a user.

17. The method of claim 16, further comprising:
prior to mixing the transmission signal with the reception signal to create a low frequency return signal, delaying the reception signal received by the antenna by a time delay.

18. The method of claim 17, wherein the time delay is approximately 5 nanoseconds.

19. The method of claim 16, wherein the antenna is a single patch array antenna.

20. The method of claim 16, further comprising:
presenting the determined range to a user via at least one of a display, a radio frequency transmitter, an audio alert, or a visual alert.

* * * * *